S. Webb,
Water Wheel.

Nº 70,301. Patented Oct. 29, 1867.

Witnesses
Thos. H. Hutchins
J. B. Cochran

Inventor
Samuel Webb

United States Patent Office.

SAMUEL WEBB, OF JOLIET, ILLINOIS.

Letters Patent No. 70,301, dated October 29, 1867.

IMPROVEMENT IN WATER-WHEELS.

The Schedule referred to in these Letters Patent and making part of the same.

Be it known that I, SAMUEL WEBB, of the town of Joliet, in Will county, and State of Illinois, have invented a new and useful Improvement on a Water-Wheel; and I do hereby declare that the following is a full, clear, and exact description of the construction and operation of the same, reference being had to the annexed drawings, and the letters of reference marked thereon, making a part of this specification.

Figure 1:
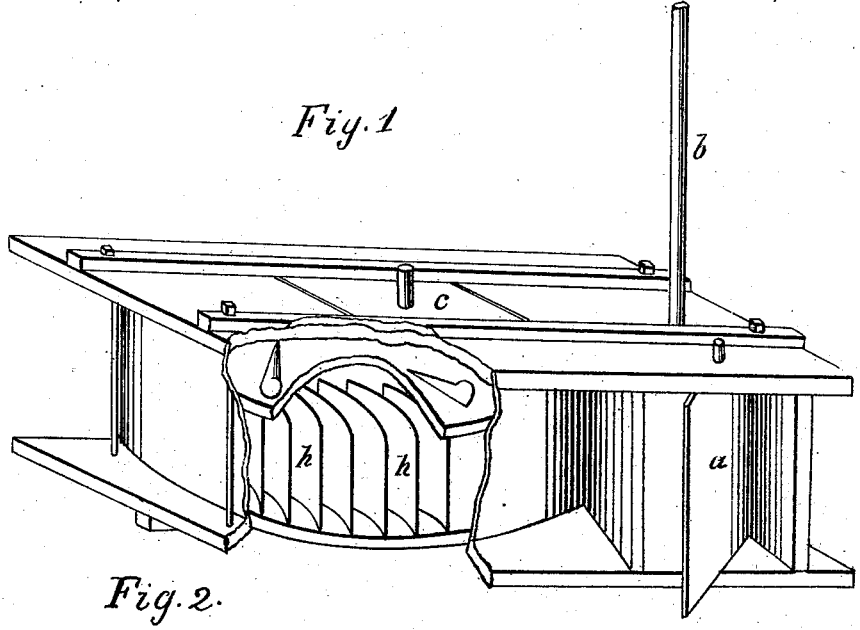

Figure 1 represents a perspective view of the wheel enclosed within the scroll.

Figure 2:
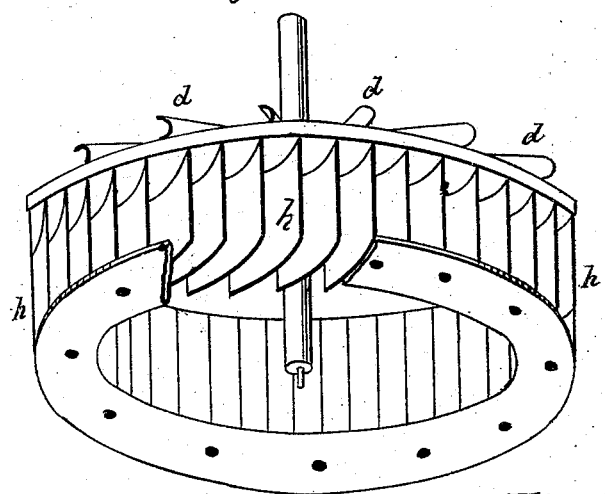

Figure 2, a view of the wheel.

Figure 3:
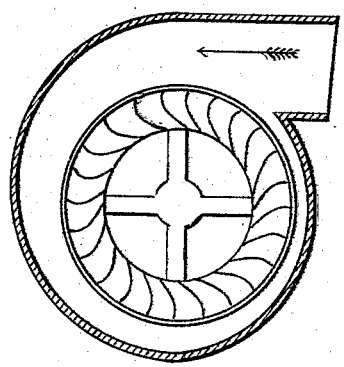

Figure 3, a diagram, showing the position of the wheel in the scroll; and

Figure 4:
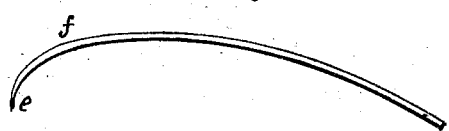

Figure 4 a sectional view of a single bucket of the wheel to show its exact shape.

As the water is let in at the gate $a$, fig. 1, it engages with the buckets, passing between them, and discharges from the centre of the wheel beneath, on account of the position of the wheel, as shown in fig. 3. In most wheels great difficulty is experienced in running in dead water. To obviate this difficulty I use an air pipe, $b$, shown in fig. 1, which lets in a current of air, causing the wheel to run with great steadiness. $c$ represents a lid or door, immediately over the wheel, to give facilities for making repairs, &c., without taking the scroll apart, as is ordinarily done. The wheel is constructed with two plane parallel wooden disks, grooved to receive the ends of the buckets, which are of metal, and held together by means of rods, at intervals, passing just behind the buckets, as shown in fig. 2. The wheel is narrower than the scroll so as to allow a body of water to rest thereon to hold it steady, and to utilize said body of water I use the floats or buckets $d\ d\ d$ attached to the upper side of the wheel, shown in fig. 2, which greatly enhances the power. The floats or buckets $d$ are in shape similar to the longitudinal section of a cone set to present the concave surface to the water at an angle of about forty-five degrees, with a line from the periphery to the centre. The peculiar improvement I claim to have made, aside from the introduction and use of the air-tube $b$ and floats or buckets $d\ d\ d$, is the peculiar shape of the buckets, as shown in fig. 4.

I am aware of the use of semicircular buckets, and also those using the segment of a circle, as shown in fig. 4, from $e$ to $f$, and straight from $f$ to $g$; but I use a bucket of the peculiar shape as shown, combining the segments of two circles, placing the shorter one at the periphery of the wheel.

Claim.

What I claim as new in my invention, and desire to secure by Letters Patent, is—

The combination of the air-tube $b$, the floats or buckets $d\ d\ d$, the lid $c$, and buckets $h\ h$, of the peculiar shape described, all constructed and arranged as and for the purposes set forth.

SAMUEL WEBB.

Witnesses:
THOS. H. HUTCHINS,
F. B. COCHRANE.